US006411408B1

(12) United States Patent
Dennis et al.

(10) Patent No.: US 6,411,408 B1
(45) Date of Patent: Jun. 25, 2002

(54) APPARATUS AND METHOD FOR HIGH REPETITION RATE OPTICAL COMMUNICATION OVER LONG UNREPEATED SPANS

(75) Inventors: Michael L. Dennis, Alexandria; Irl N. Duling, III, Round Hill, both of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/364,914

(22) Filed: Jun. 10, 1999

(51) Int. Cl.[7] .................................................. H04J 14/02

(52) U.S. Cl. ..................... 359/124; 359/124; 359/125; 359/126; 359/127; 359/128; 359/129; 359/130; 359/131; 359/132; 359/133; 359/134; 359/161; 359/173; 385/27; 385/37

(58) Field of Search ................................ 359/124, 125, 359/126, 127, 128, 129, 130, 131, 132, 133, 134, 173, 161

(56) References Cited

U.S. PATENT DOCUMENTS

| | | | | |
|---|---|---|---|---|
| 5,583,959 A | * | 12/1996 | Nakazawa et al. | ............. 385/27 |
| 5,737,460 A | | 4/1998 | Damen et al. | |
| 5,986,789 A | * | 11/1999 | Kawal et al. | ................ 359/173 |
| 6,163,638 A | * | 9/2000 | Eggleton et al. | .............. 385/37 |
| 6,327,061 B1 | * | 12/2001 | Desurvire | .................... 359/124 |

* cited by examiner

Primary Examiner—Leslie Pascal
Assistant Examiner—Dzung Tran
(74) Attorney, Agent, or Firm—John J. Karasek; L. George Legg

(57) ABSTRACT

A method and apparatus for increasing the upper frequency range of an optical communication system, particularly one designed to communicate over, repeaterless, distances. A series of temporally interleaved optical solitons of different frequencies are generated, and transmitted and detected by wavelength division multiplexing. An adiabatic transmission line forms part of the transmission link, and serves to narrow the bandwidth of the pulses during propagation. As a result, one can generate the solitons with substantially overlapping spectra, thus increasing the rate at which they are produced, but, because of the narrowed spectra, still resolve them in frequency at the system's receiver.

6 Claims, 3 Drawing Sheets

APPARATUS AND METHOD FOR HIGH REPETITION RATE OPTICAL COMMUNICATION OVER LONG UNREPEATED SPANS

BACKGROUND OF THE INVENTION

Unrepeated transmission of optical data over long fiber spans is of interest in a number of applications, such as fiber cable links between cities, or links undersea. In both instances, it would be very costly to extract the cable system for repair. It is therefore of great interest to develop optical transmission systems which have no active parts, such as booster amplifiers, which consume power and need periodic repair and replacement. Damen et al., U.S. Pat. No. 5,737,460, presents an optical transmission system which uses solitons, to carry data. Solitons can propagate extraordinarily long distances without distortion, and are thus excellent candidates for long distance repeaterless systems. Unfortunately, the Damen et al. invention has a limited upper bandwidth, which in turn limits the speed with which data encoded on solitons can be transmitted. One way to increase bandwidth in any digital communication system is to wavelength division multiplex the bits, that is generate bits having spectra with differing center frequencies, launch all the bits on one line, and then use filter banks to separate the bits by frequency and separately detect them. Thus if one uses N multiplex channels with a corresponding N detectors for each channel operating at maximum detection rate, one has increased system data rate by a factor of N. Present commercial data systems do this using Non-Return-to-Zero encoding. Unfortunately, Non-Return-to-Zero data bits of different frequencies in this scheme are given to distortion and cross-talk due to the fiber Kerr nonlinearity, and hence are inherently given to signal degradation. Soliton encoded signals of different frequencies have a similar difficulty in that they will distort one another if they collide asymmetrically, that is if they do not pass completely through one another. To avoid inter-soliton distortion, one must launch the solitons far apart to ensure that they have no appreciable temporal overlap at time of generation, so that subsequent collisions will be symmetrical. Unfortunately, this implies a low transmission rate.

SUMMARY OF THE INVENTION

Accordingly, an object of the invention is to permit optical communication over long distances by a system that is passive, requiring active components only at system termini.

Another object is to do this using optical solitons.

Another object is to increase the upper bandwidth of such a system, and hence its upper data rate.

Another object is to do so by wavelength division multiplexing.

Another object is do so with a system that is resistant to bit distortion and inter-bit cross-talk.

Another object is to do the foregoing in a manner to ensure that the solitons collide only symmetrically.

In accordance with these and other objects made apparent hereinafter, the invention concerns an optical communications system having an adiabatic link, a pulse generator which launches temporally interleaved solitons into the adiabatic link, and a receiver with a wavelength division de-multiplexer. Each pulse has a unique center frequency but bandwidths which substantially overlap. The adiabatic link causes the solitons' bandwidths to narrow such that at the receiver the bandwidths are substantially distinct, permitting detection of each soliton by the wavelength division de-multiplexer.

Because the wavelength division multiplexed solitons are interleaved at launch, i.e. launched separately rather than in a virtual state of asymmetric collision, the solitons will not mutually distort each other as they initially disperse. Wavelength division multiplexing the solitons secures an increase in system data rate proportional to the number of multiplex channels used; interleaving the solitons, rather than generating one soliton per pulse from the generator, further increases the data rate without the cross-channel distortion in other communication systems, such as that based on Non-Return-to-Zero encoding.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
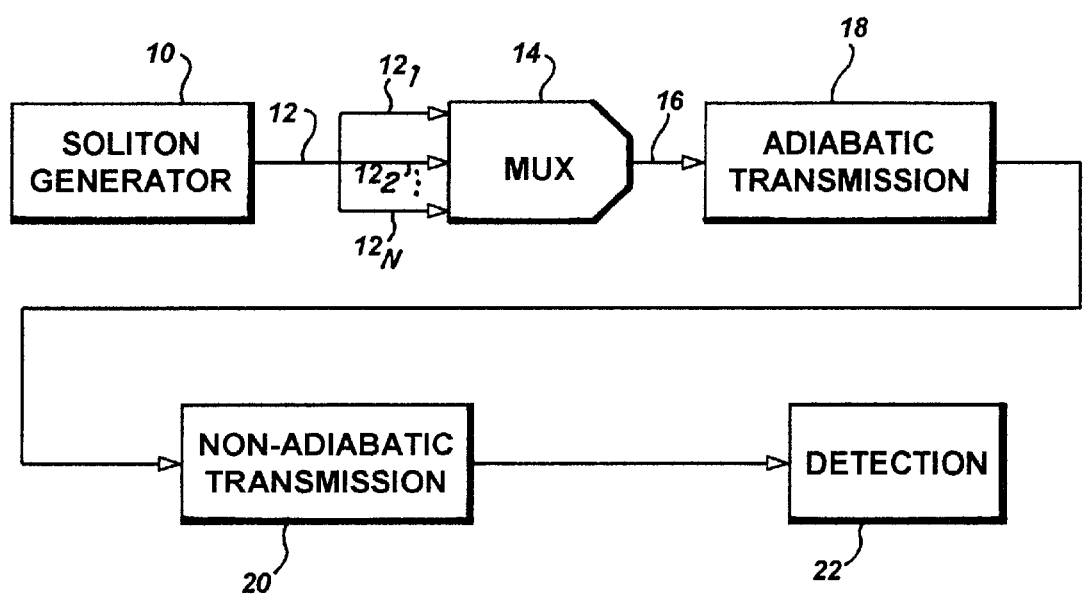
FIG. 1 is a schematic of a system according to the invention.

With reference to the drawing figures, wherein like numbers indicate like parts throughout the several views, FIG. 1 shows a schematic representation of an embodiment according to the invention. Generator 10 produces, in any known manner, a stream of optical solitons on output 12, each of which is tapped into N parallel lines $12_1$ to $12_N$, and fed to optical multiplexer 14. Generator 10 produces pulses of a sufficiently high intensity to permit creation of optical solitons when the pulses enter adiabatic propagation line 18, and of a very short duration to avoid stimulated Brillouin scattering. Multiplexer 14 then launches the N pulses onto a single optical line 16. The optical lengths of lines $12_1$ to $12_N$ differ by preset amounts to cause the phases of the N pulses to differ effective to temporally interleave the N pulses at the input to multiplexer 14, resulting in a stream of N interleaved pulses on line 16 resulting from each pulse from multiplexer 14. Thereafter, the N interleaved solitons propagate in a manner like that of the Damen et al. patent. The pulses enter adiabatic transmission line 18 where the pulses evolve into solitons. The specific form of these optical solitons is a sinusoidal signal having an hyperbolic secant envelope, the generation of which is known to those in this art. While traversing line 18, the solitons-spread temporally and narrow spectrally. Thereafter the solitons propagate through a (typically much longer) non-adiabatic transmission line 20. The scheme of FIG. 1 inherently increases the sensitivity of detector 22, and hence correspondingly increases the system power budget, because the narrowed bandwidth of the solitons resulting from propagation through line 18 reduces the bandwidth detector 22 must have to reliably detect any given soliton, thereby improving the sensitivity of detector 22. Furthermore, because the solitons are temporally interleaved via delay lines 12, they are brought together in line 16 separated from one another in time. If this were not so, i.e. if the solitons were launched onto a common line with significant initial temporal overlap, then the solitons would in effect be launched initially in a state of asymmetrical collision with one another, which, as discussed above, would result in mutual distortion. But because the solitons are launched time interleaved, any collision between solitons is virtually assured to be symmetrical, ensuring that the soliton encoded data can remain intact over long transmission distances. Detector 22 then detects the solitons by conventional wavelength division de-multiplexing, e.g. by a bank of optical filters. Although solitons, as waveforms having a hyperbolic secant form, in theory have infinite temporal tails, their peaks are relatively sharp, and thus can be interleaved relatively closely and still be treated for practical purposes as if they have no temporal overlap. At 1550 nm, the minimum effective inter-soliton spacing is about four times their temporal width (full-wave at half maximum), which is a reliable rule in general.

The scheme of FIG. 1 produces N interleaved solitons for each soliton pulse produced by generator 10. One could dispense with parallel taps $12_1$ to $12_N$, and simply operate generator 10 at a sufficiently slow repetition rate that the solitons do not overlap. This, however, is less desirable because it inherently reduces the transmission rate through the system. Similarly, each of the N solitons preferably is of a different frequency, i.e. of a different frequency sinusoid within a hyperbolic secant envelope. This means that the spectrum of each soliton will have a different center frequency, permitting separation by optical filters. Thus detector 22 will optimally have a bank of N optical filters to separate out the N solitons prior to detection.

Because the N solitons result from one optical pulse, the solitons are necessarily closely spaced to one another in frequency. Stated alternatively: although the center frequencies of their spectra are distinct, their spectra will overlap substantially. As such, they would be difficult for any filter bank to separate, making wavelength division de-multiplexing problematic, and making any data transmission system based on these solitons prone to high bit error rates. This is compensated for by adiabatic line 18 narrowing the spectrum of each soliton (as it temporally spreads each). In this manner, the data rate of the system increases by the generation of N solitons per each optical pulse, and the sensitivity of the system increases by the adiabatic evolution of the solitons. Thus it is advantageous that the solitons initially have substantially overlapping spectra, and that at detector/receiver 22 the solitons have a substantially distinct spectra, as this allows the maximum date to be transmitted within a limited optical bandwidth. How much overlap, and how much distinctness, depend on the bit error rate one can tolerate, which is a matter of design choice.

Adiabatic transmission line 18 can be any optical material which will permit adiabatic evolution of the initially broadband, high intensity, solitons into narrowband, lower intensity ones, while at the same time minimizing the amount of stimulated Brillouin scattering which can occur during this evolution. This can preferably be any optical fiber having high anomalous dispersion at soliton center frequencies of interest, and a large single mode field area to reduce the volume specific intensity of the solitons propagating therein, an example of which is a standard single mode optical fiber with a dispersion of roughly 15–20 psec/nm-km at 1550 nm. Non-adiabatic line 20 can be virtually any optical fiber because the low intensity of the solitons exiting adiabatic line 18 avoids stimulated Brillouin scattering, ensuring that the solitons can propagate substantially unscattered. Other than this, there is little restriction on the kind of optical cable one can use with the scheme of FIG. 1: optical solitons can occur in any material having the Kerr effect and anomalous dispersion to maintain solitons intact, and this effect is a characteristic of virtually any transparent material.

Figure 2:
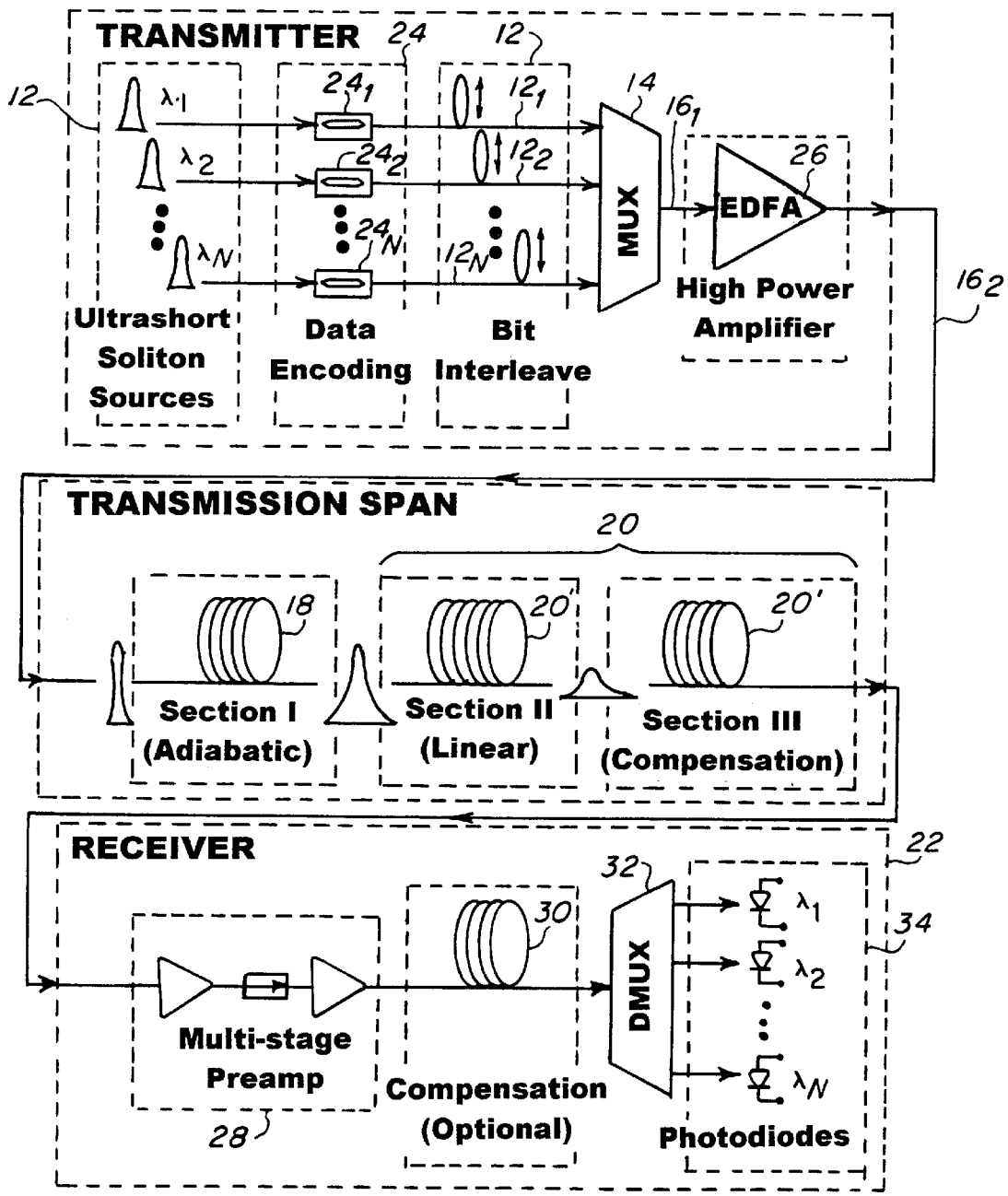
FIG. 2 is a schematic of another embodiment according to the invention.

FIG. 2 schematically illustrates an embodiment of the invention for digitally encoding the solitons. N lines carrying respective solitons $\lambda_1$ through $\lambda_N$ enter a data encoder 24, each line having corresponding digital encoders $24_1$ to $24_N$, which selectably permit or block transmission of input solitons through encoder 24. Lines $12_1$ through $12_N$ have preselected optical lengths chosen to shift arrival times of the solitons at multiplexer 14 so as to bit interleave solitons $\lambda_1$ through $\lambda_N$ at the input to multiplexer 14. Multiplexer 14 launches the N interleaved solitons onto single line 16, where amplifier 26 preferably boosts the pulses prior to their reaching transmission span 18, 20 to a power level appropriate for launching a fundamental soliton. Member 26 can be any appropriate optical amplifier, for example the common and effective erbium-ytterbium doped fiber amplifier. The combination of encoder 24, and interleaver 12, creates at line 16 a data stream in which the N interleaved solitons represent individual data bits, and the suppression of selected ones of these solitons by encoder 24 encodes onto this data stream digital information in the form of digital 1's and 0's, i.e. the presence or absence of selected ones of the N solitons.

This data stream traverses span 18, 20, in which the solitons evolve adiabatically in fiber section 18 in the manner above described, and are transmitted to receiver/detector 22 via non-adiabatic fiber 20'. Fiber 20' can be virtually any good optical cable material, and is preferably simple single mode optical fiber. One can also include optional section 20" of dispersion compensating fiber to correct for any excess dispersion inherent in span 18, 20'. Receiver 22 isolates and boosts the data stream in stage 28 preparatory to signal detection, and uses a further span of dispersion compensating fiber 30 to ensure that the solitons arrive at time division de-multiplexer 32 spaced in time from one another to permit clocked recovery via photodiodes in member 34.

The compensation fiber 20' is optional and serves two functions: First, fiber 20" compensates the dispersion in the linear propagation section 20' so that the pulses arrive at the receiver at nearly their shortest possible duration; this prevents inter-symbol interference from one pulse spreading to a nearest neighbor. Second, fiber 20" compensates any timing jitter due to the soliton self-frequency shift. The latter effect originates from the combination of amplitude noise on the source pulses, stimulated Raman scattering, and the total dispersion of the link. Source amplitude noise is converted to variations in the wavelengths of the pulses (this is the so-called "soliton self-frequency shift"). This wavelength variation is converted to timing jitter by the fiber dispersion, potentially causing solitons generated by subsequent optical pulses to overtake ones generated by earlier pulses. The effect can be canceled by compensating the total dispersion of sections 18 and 20'. However, this counters compensation done to correct dispersion in linear section 20'. For optimum performance, the two effects must be balanced, so that the total dispersion of 20" is between the amount required to compensate the dispersion of 20' only, and the amount required to compensate the dispersion of both 20' and 18. The optimum dispersion of 20" is also dictated by the source amplitude noise: For very low amplitude noise, the optimum length will be very close to that required to compensate 20' only. For large amplitude noise, the optimum length will be close to that required to compensate both 18 and 20'. The optimum dispersion is most readily determined by numerical simulation, taking into account the source amplitude noise and the Raman nonlinearity of the fiber, as well as the usual parameters for the fibers (dispersion, Kerr nonlinearity, mode field area) and the pulses (energy, duration, bandwidth, wavelength.) Alternatively, the length may be determined empirically by a simple cut-back technique, i.e., starting with a length that would compensate the dispersion of the entire link and progressively cutting back until the link performance is optimized.

The function of the compensation fiber 30 is identical to that of the compensation fiber 20" in the transmission span: To optimize the total link dispersion, accommodating the effects of dispersive pulse broadening and of soliton self-frequency shift induced timing jitter. In an implementation of the complete link, the dispersion compensation may be performed at either 20", or 30; alternatively, both 20" and 30 may be used so long as the total dispersion of the two sections is appropriate to mitigate the aforementioned effects.

Figure 3:
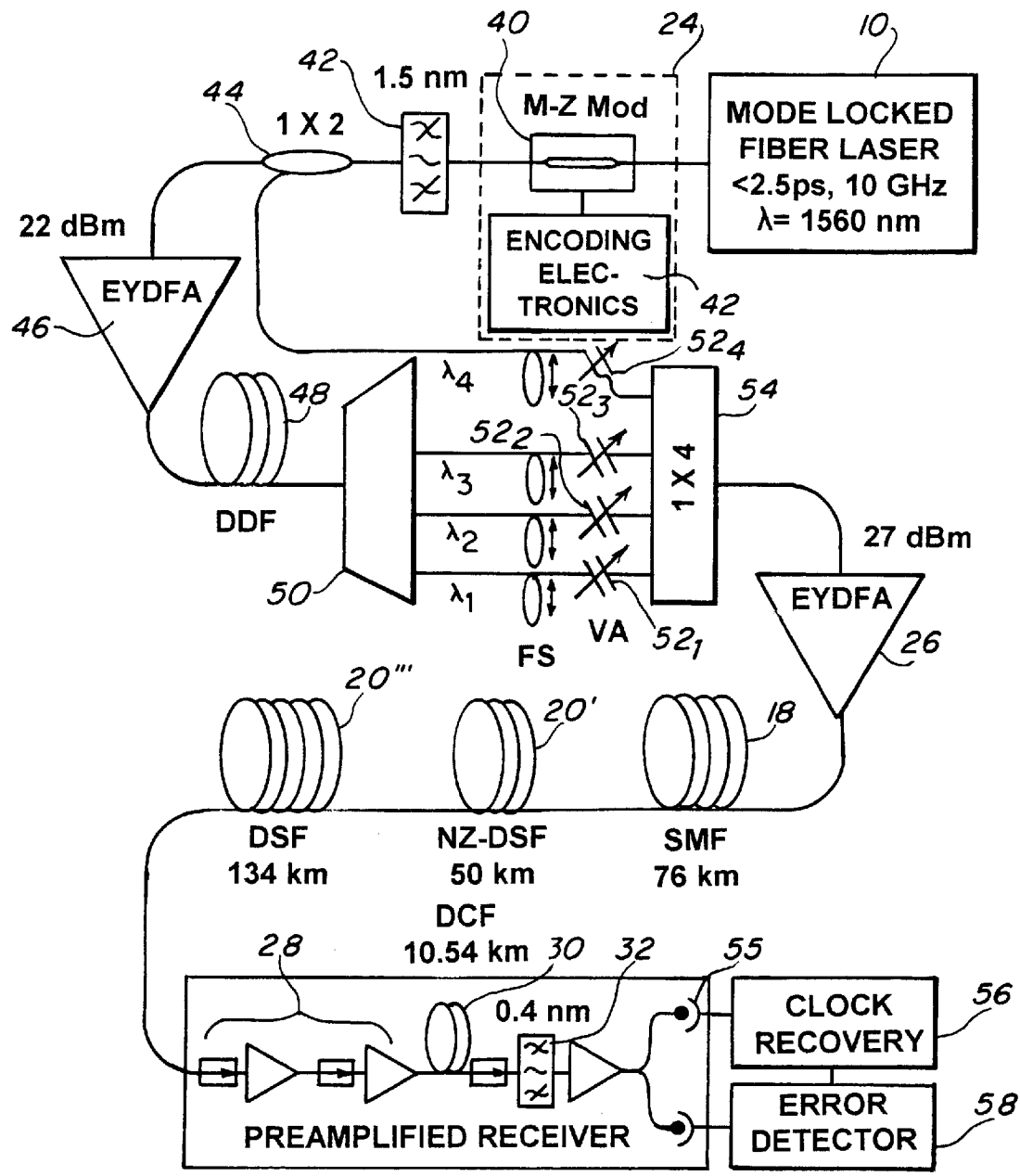
FIG. 3 is a circuit diagram of an embodiment according to the invention.

FIG. 3 is a circuit diagram of a system used to demonstrate proof of principle for the invention, and illustrates the sort of hardware by which one may conveniently practice features of the invention. Fiber laser 10 with center wavelength 1560 nm is mode locked to pulse at a rate on the order of 10 GHz. and generates ultra short pulses of 2.5 psec duration. A Mach-Zehnder optical modulator 24 receives the output pulse, and, responsive to encoding electronics 42, either permits or suppresses transmission of the optical pulse through modulator. 24. Optical filter 42 cleans spectral artifacts from the signal output from modulator 24, which is divided by optical splitter 44. One portion of splitter 44's output goes to erbium-ytterbium doped fiber amplifier 46, which has a nominal saturation output power of 22 dBm. After boosting by amplifier 46, decreasing dispersion fiber 48 spreads the spectrum of the soliton prior to entering filter bank 50. Filters 50 separate out portions of the pulses' spectra into three channels of respective center frequencies $\lambda_1$ to $\lambda_3$. Upon exiting filter bank 50, the signal in each channel evolves into a separate pulse, the pulses collectively having distinct center frequencies $\lambda_1$ to $\lambda_3$, and enter corresponding variable attenuators $52_1$ to $52_3$ to balance the signal level in each of the four lines prior to reaching star coupler 54. The other portion of splitter 44's output is fed unfiltered to variable attenuator $52_4$, and retains its original spectrum at the same center frequency, denominated $\lambda_4$. Attenuators $52_1$ to $52_4$ could advantageously be replaced by variable gain amplifiers. The four solitons are combined onto one line by star coupler 54, after undergoing variable delays between filter 50 and coupler 54 to ensure that the four solitons arrive at coupler 54 time interleaved. This can be done by using a conventional fiber stretcher in each of these optical paths between members 50 and 54. Thereafter, amplifier 26, similar to amplifier 46, boosts the interleaved signal prior to transmission portions 18, 20', 20".

Cable 18 is ordinary single mode fiber chosen to have the characteristics for adiabatic propagation described above. Its length is nominally 76 km, but its length is optimally that necessary to permit as much adiabatic evolution as the solitons can undergo. Dispersion shifted fiber 20''', nominally 134 km long, is, selected to have a length according to its attenuation: the signal input to receiver 55 is chosen sufficient to allow error-free decoding of the data, or at least permit operation within a tolerable error rate, a design matter within the skill of the art. The detector is as described above, with preamplifier and isolator 28, optional dispersion compensating fiber 30, filter bank 32, and clocked detection of plural photodiodes 55.

To do proof of principle tests, the circuit of FIG. 1 placed modulator 40 so that all of the N=4 solitons receive identical modulation. In a non-test system this modulator would be removed, and separate modulators placed between members 50 and 54.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein.

What is claimed is:

1. An optical communications system comprising:

an optical transmitting medium, said medium comprising at least one adiabatic portion;

a generator disposed effective for launching a plurality of temporally interleaved solitons into said at least one adiabatic portion of said transmitting medium; and a receiver comprising a wavelength division de-multiplexer;

wherein said launching by said generator causes each of said plurality of solitons to have a center frequency different from each of the other of said plurality of solitons; and wherein, said adiabatic portion of said transmission medium is selected effective to cause, upon said each of said plurality of solitons traversing said adiabatic portion, said each of said plurality of solitons to have a bandwidth substantially distinct from said other of said plurality of solitons, effective to permit detection of said each of said plurality of solitons by said wavelength division de-multiplexer.

2. The system of claim 1, wherein said generator is adapted to launch said each of said plurality of solitons such that said each of said plurality of solitons has a bandwidth which substantially overlaps that of at least one of said other of said plurality of solitons.

3. The system of claim 1, wherein the dispersion between said generator and said receiver is denominated the link dispersion, and wherein said system further comprises a dispersion compensator, said compensator having a dispersion in an amount between that of said link, and that of said link less the dispersion of said adiabatic portion.

4. The system of claim 3, wherein said generator is adapted to launch said each of said plurality of solitons such that said each of said plurality of solitons has a bandwidth which substantially overlaps that of at least one of said other of said plurality of solitons.

5. An method of optical communication comprising:

launching a plurality of temporally interleaved solitons into an adiabatic transmitting medium; said launching being effective to cause each of said plurality of solitons to have a center frequency different from each of the other of said plurality of solitons; and selecting said adiabatic transmitting medium effective to cause, upon said each of said plurality of solitons traversing said adiabatic transmitting medium, said each of said plurality of solitons to have a bandwidth substantially distinct from said other of said plurality of solitons, effective to permit detection of said each of said plurality of solitons by said wavelength division de-multiplexer.

6. The method of claim 5, wherein said launching said each of said plurality of solitons such that said each of said plurality of solitons has a bandwidth which substantially overlaps that of at least one of said other of said plurality of solitons.

\* \* \* \* \*